US010939530B2

(12) United States Patent
Fu et al.

(10) Patent No.: US 10,939,530 B2
(45) Date of Patent: Mar. 2, 2021

(54) METHOD, DEVICE, AND SYSTEM FOR CONTROLLING SMART LIGHT

(71) Applicant: Beijing Xiaomi Mobile Software Co., Ltd., Beijing (CN)

(72) Inventors: Qiang Fu, Beijing (CN); Weiguang Jia, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 323 days.

(21) Appl. No.: 15/485,941

(22) Filed: Apr. 12, 2017

(65) Prior Publication Data

US 2017/0311416 A1 Oct. 26, 2017

(30) Foreign Application Priority Data

Apr. 20, 2016 (CN) .......................... 201610248690.1

(51) Int. Cl.
*H05B 37/02* (2006.01)
*H05B 47/175* (2020.01)
(Continued)

(52) U.S. Cl.
CPC .......... *H05B 47/175* (2020.01); *G06F 3/147* (2013.01); *G08C 23/04* (2013.01); *H05B 47/19* (2020.01); *Y02B 20/40* (2013.01)

(58) Field of Classification Search
CPC . H05B 37/0245; H05B 37/0272; G06F 3/147; G08C 23/04; Y02B 20/48
See application file for complete search history.

(56) References Cited

U.S. PATENT DOCUMENTS 8,195,711 B2 * 6/2012 Grossman ............. G06F 16/258
707/802
8,228,163 B2 * 7/2012 Cash ...................... H05B 47/19
340/3.5
(Continued)

FOREIGN PATENT DOCUMENTS

CN 104154467 A 11/2014
CN 104333959 A 2/2015
(Continued)

OTHER PUBLICATIONS

Extended European Search Report issued in corresponding EP Application No. 17167294, dated Jul. 7, 2017, 11 pages.
(Continued)

*Primary Examiner* — Amy Cohen Johnson
*Assistant Examiner* — Jianzi Chen
(74) *Attorney, Agent, or Firm* — Arch & Lake LLP

(57) ABSTRACT

Methods, devices, and systems are provided for controlling a smart device that may emit light of different colors. The method may include: determining first light color information of a first smart light when the first smart light is turned on; broadcasting a device open notification carrying the first light color information; receiving the device open notification broadcast by the first smart light, the device open notification carrying the first light color information of the first smart light; displaying a control option corresponding to the first smart light according to the first light color information; and when receiving an executing instruction of a target function triggered by the control option corresponding to the first smart light, sending a control request corresponding to the target function to the first smart light; receiving the control request corresponding to the target function sent by the control device and executing the target function.

18 Claims, 8 Drawing Sheets

(51) Int. Cl.
 *H05B 47/19* (2020.01)
 *G06F 3/147* (2006.01)
 *G08C 23/04* (2006.01)

(56) References Cited

U.S. PATENT DOCUMENTS

| | | | |
|---|---|---|---|
| 2005/0007616 A1* | 1/2005 | Sugiyama | G06F 3/0481 |
| | | | 358/1.13 |
| 2010/0045205 A1 | 2/2010 | Bergman et al. | |
| 2013/0002157 A1* | 1/2013 | van de Ven | H05B 45/60 |
| | | | 315/192 |
| 2015/0359070 A1* | 12/2015 | Mead | H05B 47/16 |
| | | | 315/154 |
| 2015/0382436 A1 | 12/2015 | Kelly et al. | |
| 2016/0027262 A1 | 1/2016 | Skotty et al. | |
| 2016/0085431 A1 | 3/2016 | Kim et al. | |
| 2016/0157326 A1 | 6/2016 | Kelly et al. | |
| 2016/0174345 A1 | 6/2016 | Kelly et al. | |
| 2016/0192461 A1* | 6/2016 | Minsky | H05B 45/20 |
| | | | 315/294 |
| 2017/0265286 A1* | 9/2017 | Song | G06F 3/04886 |

FOREIGN PATENT DOCUMENTS

| | | |
|---|---|---|
| CN | 104582167 A | 4/2015 |
| CN | 104735870 A | 6/2015 |
| CN | 105392251 A | 3/2016 |
| CN | 105487857 A | 4/2016 |
| JP | 2015041438 A | 3/2015 |
| WO | 2009150571 A1 | 12/2009 |
| WO | 2013023265 A1 | 2/2013 |
| WO | 2007004097 A1 | 1/2017 |

OTHER PUBLICATIONS

Notification of Reasons for Refusal (including English translation) issued in corresponding Japanese Application No. 2017-567744, dated Sep. 21, 2018, 11 pages.
Office Action issued in corresponding Russian Application No. 2017146231/07(079023), dated Sep. 28, 2018, 6 pages.
Chinese Office Action dated Nov. 14, 2017 corresponding to Chinese Application No. 201610248690.1 and English translation, (16p).
Indian Office Action dated Jul. 22, 2019 corresponding to Indian Application No. 201747011201 and English translation, (5p).
Office Action issued to European Patent Application No. 17167294.2 dated Apr. 14, 2020, (12p).

\* cited by examiner

METHOD, DEVICE, AND SYSTEM FOR CONTROLLING SMART LIGHT

CROSS-REFERENCE TO RELATED APPLICATION

This application is based on and claims priority to Chinese Patent Application Serial No. 201610248690.1, filed with the State Intellectual Property Office of P. R. China on Apr. 20, 2016, the entire contents of which are incorporated herein by reference.

FIELD

The present disclosure relates to computer technology field, and more particularly to a method, a device and a system for controlling a smart light.

BACKGROUND

With the development of computer technologies and appearance of smart devices, such as smart temperature controllers, smart locks, smart lighting and so on, the prospect of greater user convenience, efficiency and remote control has been on the rise over the last several years. Specifically, current capabilities allow a user to control connected smart devices using various controlling devices, such as smartphones, tablets and personal computers. For example, a user may control home lighting via wired or wireless communication networks. When a smart light is activated, an open notification is broadcast to nearby devices that carries an identifier or information about the smart light (i.e. a device type). Upon receiving the broadcast, an indication of the smart light along with a corresponding control option is displayed on an interface of the controlling device. The user may then control the smart light to execute a desired operation by operating the control option on the controlling device.

Often, multiple smart devices, such as multiple lights, may need controlled simultaneously. As such, a controlling device can receive multiple open notifications, continuously, indicating the device type. However, the controlling device cannot display the control options of the multiple smart lights with difference. Therefore, when a certain smart light is to be controlled, the user needs to check one-by-one to find the smart light to be controlled. Depending on the number of smart devices connected, this approach can be fairly inconvenient and inefficient.

SUMMARY

The present disclosure provides systems and methods for controlling smart devices, such as a smart light device, that overcomes the shortcomings of previous technologies. The technical solutions are as follows.

In one aspect of the present disclosure, a method for controlling a smart light using a control device is provided. The method includes receiving, using the control device, a device open notification broadcast by a smart light, wherein the device open notification carries at least light information corresponding to the smart light, and displaying on the control device a control option for the smart light, wherein the control option is displayed according to the light information. The method also includes selectively operating the control option to execute a target function controlling the smart light, and sending a control request to the smart light corresponding to the target function.

In another aspect of the present disclosure, a method for controlling a smart light is provided. The method includes receiving a device open notification broadcast by a smart light, wherein the device open notification carries light color information of the smart light. The method also includes displaying a control option corresponding to the smart light according to the light color information, and when an executing instruction of a target function triggered by the control option corresponding to the smart light is received, sending a control request corresponding to the target function to the first smart light.

In yet another aspect of the present disclosure, a method for controlling a smart light is provided. The method includes when a smart light is activated, determining light color information of the smart light, and broadcasting a device open notification carrying the light color information. The method also includes receiving a control request corresponding to a target function sent by a control device, and executing the target function.

In yet another aspect of the present disclosure, a control device is provided. The control device includes a receiving module configured to receive a device open notification broadcast by a first smart light, wherein the device open notification carries first light color information of the first smart light. The control device also includes a displaying module configured to display a control option corresponding to the first smart light according to the first light color information. The control device further includes a sending module configured to send a control request corresponding to the target function to the first smart light when an executing instruction of a target function triggered by the control option corresponding to the first smart light is received.

In yet another aspect of the present disclosure, a smart light is provided. The smart light includes a determining module configured to determine light color information of the smart light when the smart light is activated. The smart light also includes a broadcasting module configured to broadcast a device open notification carrying the light color information. The smart light further includes an executing module configured to receive a control request corresponding to a target function sent by a control device, and execute the target function.

In yet another aspect of the present disclosure, a system for controlling a smart light is provided. The system includes a control device configured to receive a device open notification broadcast by a smart light, wherein the device open notification carries light color information of the smart light. The control device is also configured to display a control option corresponding to the smart light according to the light color information, and send a control request corresponding to a target function to the smart light when receiving an executing instruction of the target function triggered by the control option corresponding to the smart light. The system also includes the smart light configured to determine light color information of the smart light when the smart light is activated. The smart light is also configured to broadcast a device open notification carrying the light color information, and receive the control request corresponding to the target function sent by the control device and execute the target function.

It should be understood that, the above general description and following detail description are exemplary and explanatory, and shall not be construed to limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention, in which.

Figure 1:
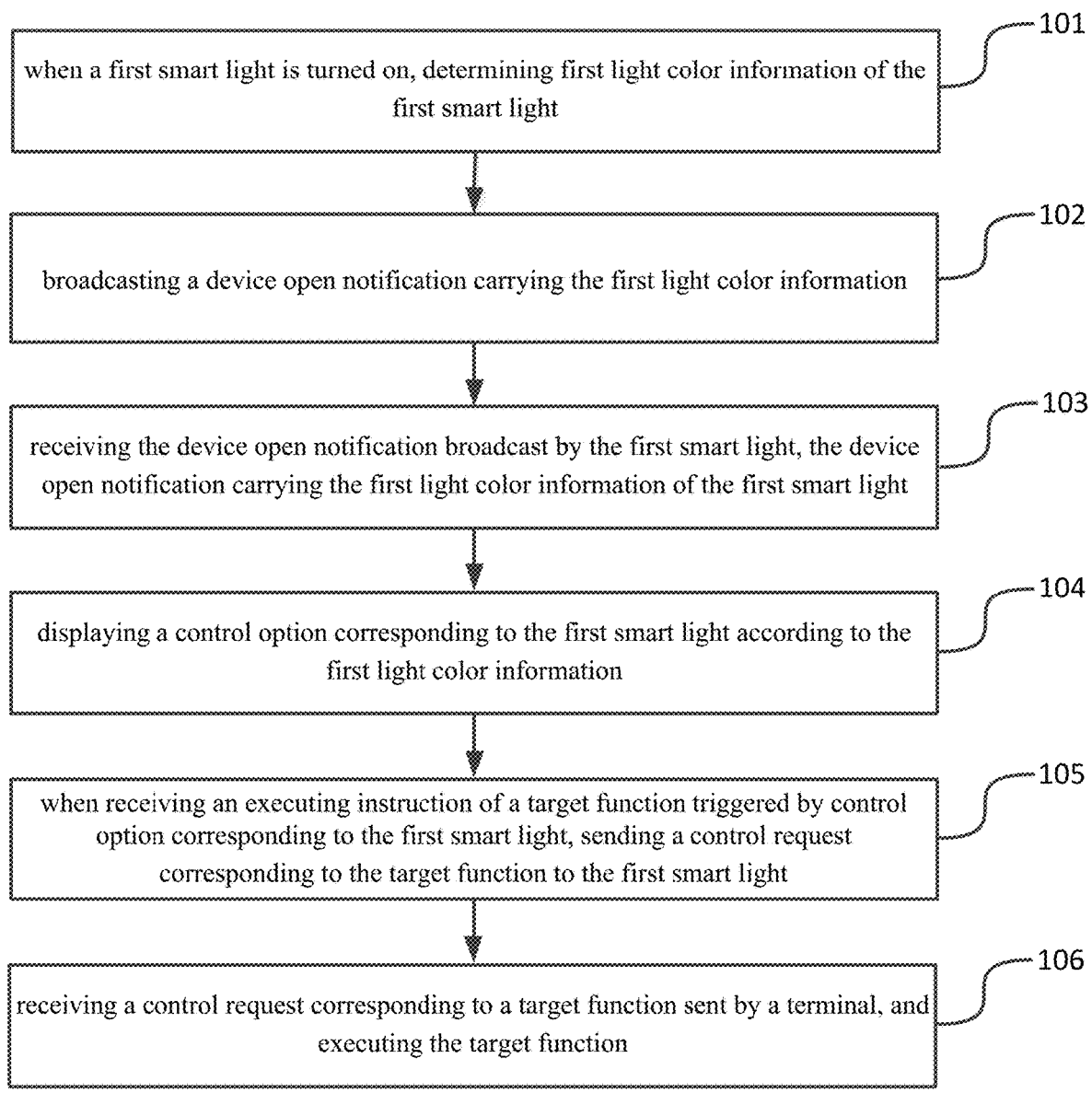
FIG. 1 is a flowchart illustrating steps of a method for controlling a smart light in accordance with aspects of the present disclosure.

Specific embodiments of the present disclosure will be described in more detail with reference to drawings hereinafter. These accompanying drawings and text description are not used to limit the scope of the present disclosure in any form, but used to explain the concept of the present disclosure to those skilled in the art with reference to specific embodiments.

DETAILED DESCRIPTION

Referring to the following descriptions and drawings, these and other aspects of the embodiments of the present disclosure will be apparent. In the description and drawings, specific examples and illustrations are provided. However it should be understood that these illustrations and examples are in no way limiting. Indeed, different variants, modifications and their equivalents are possible, and considered to be within the spirit and scope of the present disclosure as defined by the claims.

In accordance with the present disclosure, systems and methods for controlling smart devices, such as smart lights, are provided. These methods, as will be described, may be carried out using various control devices and smart devices. In particular, control devices may include portable or mobile phones, smartphones, tablets, laptops, personal computers or computer terminals, and so on. Various management applications for controlling smart devices, such as smart lights, may be installed on the control device. In some embodiments, a control device may include a processor, a memory, and transceiver for communicating with various smart devices. In particular, the processor may be configured to control processes of controlling different smart devices. The memory may be used to store data needed and generated during the processes of controlling the smart device. The transceiver may be used to receive and transmit messages, as well as other signals or information. Control devices may also include various input and output component, such as monitors, displays, screens, touchscreens, buttons, and the like. In some aspects, a management application interface may be displayed allowing a user to control various smart devices within range.

A smart devices, in accordance with the present disclosure, may include a processor, a memory, and a transceiver for communicating with various control devices as well as other smart devices. In particular, the processor may be configured to carry out processes for controlling the smart device. The memory may be used to store data needed and generated during the processes of controlling the smart device. The transceiver may be used to receive and transmit messages, as well as other signals or information. Some smart devices, such as smart lights, may include one or more light-emitting components configured to emit light of a certain color and intensity, as well as change the color and intensity.

In one implementation, a user may install on the control device a management application for controlling a smart device. The control device may then be triggered to display a login interface of the management application. After providing user authentication in the login interface, such as input user name and password, a main interface of the management application may then be displayed. Successful login in the account may then allow the user to operate the management application to control various smart devices. The smart device may include one or more of: a smart light, a smart switch, a smart socket, a smart outlet. The smart device may include a light that can emit different color according to an instruction from the control device.

Referring to FIG. 1, steps of a process in accordance with aspects of the present disclosure are shown. The process may begin as follows.

At step 101, when a first smart light is turned on or activated, a first light color information of the first smart light is determined. In one implementation, when a user turns on the first smart light, either manually or remotely, the first smart light may begin to emit light and the light information may then be determined. The light information may include the light color information, such as red, yellow and blue, and various hues. The light information may also include intensity, duration and timing information as well. Determining the light information may include accessing data or information stored in a memory, for instance. In some aspects, other information may also be determined at step 101, including device type information (i.e. an identifier for a smart light), device address information (i.e. a MAC address, IP address) and so forth.

At step 102, a device open notification carrying the first light color information is broadcast. The device open notification may be broadcast to a surrounding environment via a private communication protocol, such as a protocol established between smart device and the control device. As an example WIFI, Bluetooth, or other communication protocol may be used. In addition to the first light color information, the device open notification may carry other information, such as light intensity, duration and timing, device type, device address, device location (i.e. living room, dining room, and so on), device condition (i.e. activated, error, and so on) and so forth.

At step 103, the device open notification broadcast by the first smart light is received by a control device. After receiving the device open notification broadcast by the first smart light, the control device may then analyze the device open notification and obtain the first light color, of the first smart light, and optionally other information, such as light intensity, device type, device address, device location, device condition, and so on.

At step 104, a control option corresponding to the first smart light is displayed on the control device according to at least the first light color information. The control option may also be based on other received information, such as light intensity, duration and timing, device type, device address, device location, device condition, and so on. In some aspects, by way of the control option, the control device may carry out a process for controlling the first smart light, for instance, by specifying or changing a light color, or other light property such as intensity, timing or duration, for the first smart light. In one example, this process may include receiving a device open notification sent by a second or another smart light and determining light information, for example, therefrom. If the light information of the second smart light is the same as that of the first smart light, a light property changing request, such as a light color changing request, may then be sent to the first smart light. In some aspects, the light color changing request may carry the second light color information. A control option may then be displayed, in accordance with the first smart light and the second smart light.

Figure 2:
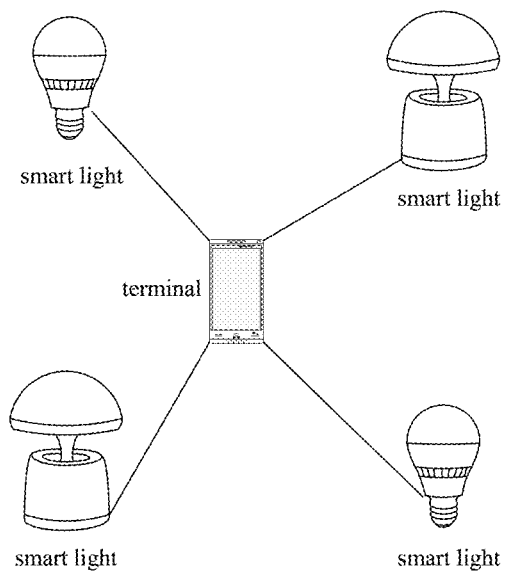
FIG. 2 is an illustration depicting a method for controlling a smart light according to an example embodiment.

In some embodiments, as shown in FIG. 2, multiple smart lights may be used. As such, multiple light colors may be pre-stored in the control device. When a number of these multiple smart lights are operated or activated substantially simultaneously, multiple the device open notifications can be broadcast simultaneously, with each device open notification carrying the light color information, for instance. As such, the control device may receive the device open notification from a second smart light before receiving that of the first smart light, and so light information, such as light color information, corresponding to the second smart light may be received before that of the first smart light. If the light color information, for instance, of the second smart light is determined to match the first smart light, a user-selected or pre-selected light color stored in the control device may then obtained, and a light color changing request generated, in accordance with the selected light color. As described, selection and light changing request may also include other change indication, including for light intensity, duration and timing. Then, the light changing request may be sent to the first smart light using the address information obtained. Note that smart lights are just one type of smart devices that may emit different colors. Other smart devices such as smart socket or smart outlets may be controlled by the control device to emit different lights as well.

As such, in some aspects, the control device may display the control option indicative of the first, second and other smart lights, using corresponding light information, whether as initially determined, or as modified. For example, a smart light may be represented or highlighted using characters, text or other visual indications in accordance with its respective color, hue, or intensity. The representation may also indicate other information, such as respective location, condition, and so forth.

In some aspects, the first smart light may change the light color to one specified by the control device. The corresponding process may be: receiving a color changing request sent by the control device, in which the color changing request carries the second light color information; and changing the light color to a light color corresponding to the second light color information. After receiving the light color changing request sent by the control device, the first smart light may analyze the light color changing request to obtain the second light color information from the light color changing request, and further obtain the second light color corresponding to the second light color information, and then change the light color to the second light color. For example, the current light color of the first smart light may be white, the second light color corresponding to the second light color information obtained by the first smart light may be red and blue, and then the first smart light may change the light color from white to red and blue. As appreciated, a variety of light colors, hues, and intensities may be implemented.

In some aspects, the control device may control the first smart light to change light color. The corresponding process may be: if the light color information carried in the device open notification sent by another smart light is received and the light color information received contains the first light color information, a light color changing request may be sent to the first smart light, in which the light color changing request carries the light color information carried in the device open notification sent by another smart light; receiving the second light color information sent by the first smart light; and displaying the control option corresponding to the first smart light according to the second light color information.

As shown in FIG. 2, when a user turns on or activates multiple smart lights, these may broadcast the device open notifications substantially simultaneously. As described, a device open notification may carry light color, as well as other information. If the control device has received the device open notification of a second smart light before receiving the device open notification sent by the first smart light, the control device may obtain the received light color information of the second smart light and generate the light color changing request after obtaining the light color information of the first smart light. The control device may then send the light color changing request to the first smart light according to the address information of the first smart light. The light color changing request carries the received light color information of the second smart light and respective location or address information.

In some aspects, the first smart light may change a light property, such as color, intensity, duration or timing, to differ from that of another smart light. For example, a light color of the first smart light may be changed from a first color to a second color. The corresponding process may be: receiving a changing request for the light property, sent by the control device, in which the changing request may also carry light information of other smart lights; changing the light property one that differs from other smart lights. The light property may then be determined or verified based on the change. Updated light information, such as an updated color information, may then be send back to the control device.

In some aspects, after receiving the light color changing request sent by the control device, a first smart light may analyze the light color changing request, obtain the light color information of other smart lights received by the control device, and determine the light colors corresponding to the light color information of other smart lights received by the control device. Then, the first smart light may obtain the pre-stored or pre-selected light information in order to achieve a different light property relative to other smart lights. For instance, the first smart light may change the light color from a first light color to a second light color. Non-limiting example colors may include red, blue, green, yellow, white, and various hues or combinations thereof. In some aspects, after making a light property modification, the first smart light may determine light information, and send the light information to the control device using the obtained device address of the control device. In case a color of the first smart light has been changed, the control device may set the color of text in the control option as according to the new, or second, light color. The corresponding process may be: displaying the control option corresponding to the first smart light, and setting a color of text in the control option as a color corresponding to the second light color.

Figure 3:
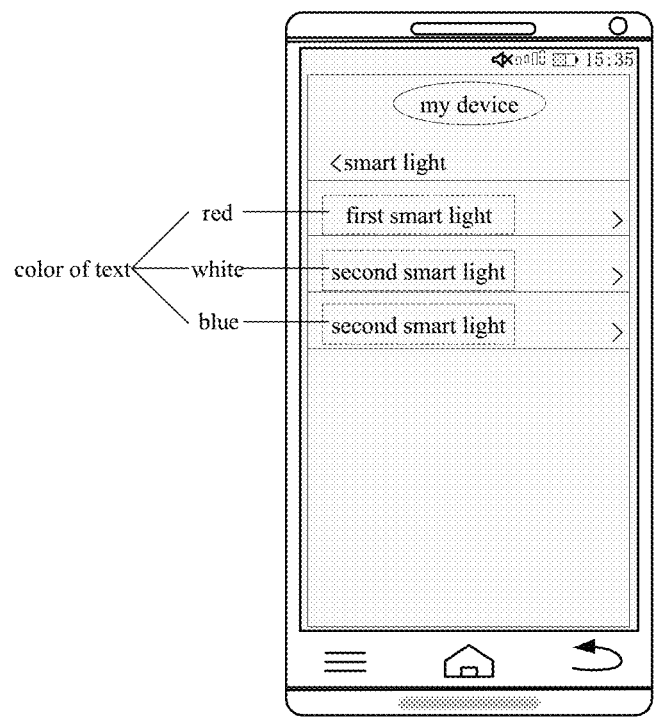
FIG. 3 is an illustration of an interface display of a control device according to an example embodiment.

In some aspects, as shown in FIG. 3, after determining the second light color corresponding to the second light color information, the control may set the color of text in the control option corresponding to the first smart light as the second light color, and then display the control option of the first smart light in an interface. This allows a user the ability to visually distinguish between different smart lights. For example, the control determines that the light color corresponding to the second light color is red, and then the color of text in the control option displayed in the interface is red.

In some aspects, if the control device determines that the second light color corresponding to the second light color information of the first smart light includes multiple colors, the color of the text in the control option is not changed when the control option is displayed, and the second light color is displayed at a certain location adjacent to the control option. For example, the second light color corresponding to the second light color information is red and blue. When the control option is displayed, the control device displays a color box (e.g. the upper half of the box is red and the lower half of the box is blue, the upper half of the circle is red and the lower half of the circle is blue, etc.) on the left side of the control option.

Figure 4:
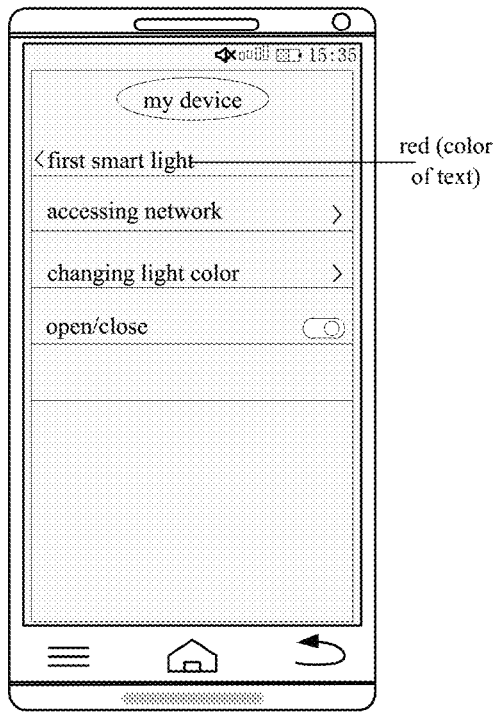
FIG. 4 is an illustration of an interface display of a control device according to an example embodiment.

Referring again to FIG. 1, at step 105, when an executing instruction of a target function triggered by the control option corresponding to the first smart light is received, a control request corresponding to the target function is sent to the first smart light. As shown in FIG. 4, after receiving the second light color information of the first smart light, the control device may display the control option (e.g. a light color changing option, an network accessing option, etc.) of the first smart light in the interface. Each control option may correspond to one target option, e.g. the network accessing option corresponds to a function of controlling the smart light to access the network, and the light color changing option corresponds to a function of changing the light color of the smart light, and so on.

When a user instruction is received, by pressing a button or touching a touchscreen in accordance with the control option, the control device may execute the target function, and then send the control request corresponding to the target function to the first smart light via a private protocol using the device address of the first smart light. For instance, the control device may control the first smart light to access the network. The corresponding process may be: when receiving an executing instruction of a target function triggered by the control option corresponding to the first smart light, obtaining a network identifier inputted by a user, and sending a network access request to the first smart light, in which the network access request carries the network identifier.

In some aspects, the control device may display the control option of the first smart light in the interface. The control option may include an open/close option, a light property changing option, a network accessing option, and so forth. If the user wants to control the first smart light to access to the network, for instance, the user may click a button or tap a touchscreen to confirm the display a network access interface. The user may then input an account and a password of the network and click or tap to continue. When the control device detects the click or tap instruction, a network identifier (account and password of the network) input by the user may be obtained, and the address information of the first smart light is obtained. Using address information of the first smart light, the network access request carrying the network identifier may then be sent to the first smart light, such that the first smart light accesses to the network corresponding to the network identifier.

In some aspects, the user may click or tap the light color changing option. When receiving the click or tap instruction, the control device may display all of the light color options. The user may click or tap the light color option to be changed to, and trigger the control device to send the light color changing request to the first smart light. The light color changing request carries the light color chosen by the user, such that the light color of the first smart light is changed to the light color chosen by the user.

At step 106, the control request corresponding to a target function sent by the control device is received, and the target function is executed. Specifically, after receiving the control request corresponding to the target function sent by the control device, the first smart light may analyze the control request, obtain the target function and then execute the target function. For example, after receiving the control request corresponding to the light color changing option sent by the control device, the first smart light may analyze the control request and then change the light color. Alternatively, the first smart light may access to the network. The corresponding process may be: receiving the network access request sent by the control device, in which the network access request carries a network identifier; and accessing to a corresponding network according to the network identifier. After receiving the network access request sent by the control device, the first smart light may analyze the network access request, obtain the network identifier and then access to the network corresponding to the network identifier. After the first smart light is accessed to the network, the control device and the first smart light may communicate with each other using the network.

Figure 5:
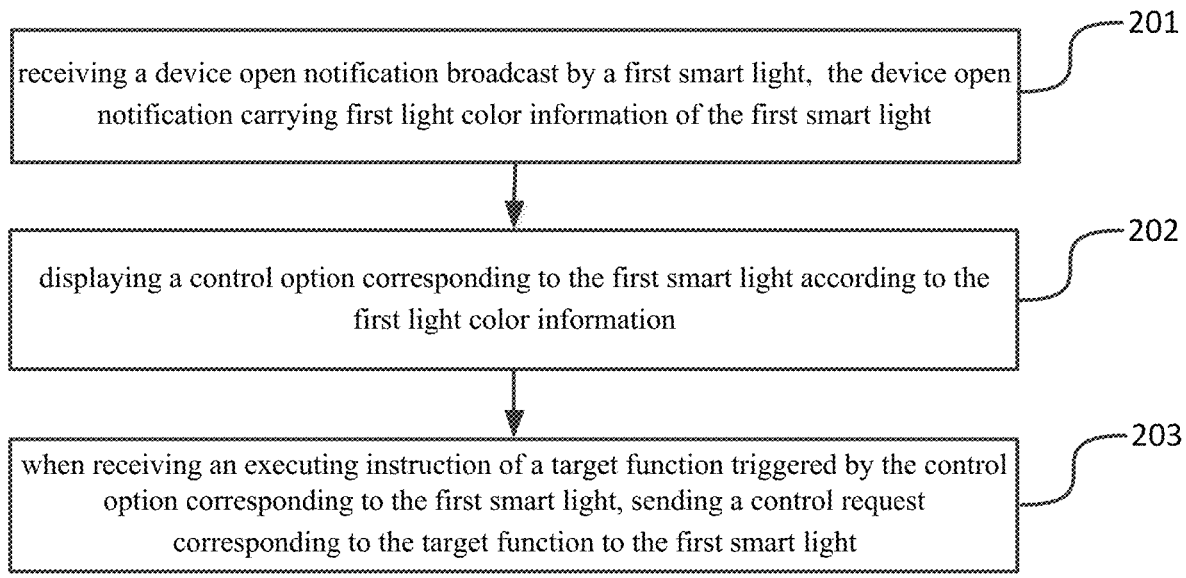
FIG. 5 is another flowchart illustrating steps of a method for controlling a smart light in accordance with aspects of the present disclosure.

Referring now FIG. 5, steps of the process in accordance with aspects of the present disclosure are shown. The process may include following steps.

At step 201, a device open notification broadcast by a first smart light is received, in which the device open notification carries first light color information of the first smart light.

At step 202, a control option corresponding to the first smart light is displayed according to the first light color information.

At step 203, when an executing instruction of a target function triggered by the control option corresponding to the first smart light is received, a control request corresponding to the target function is sent to the first smart light.

Figure 6:
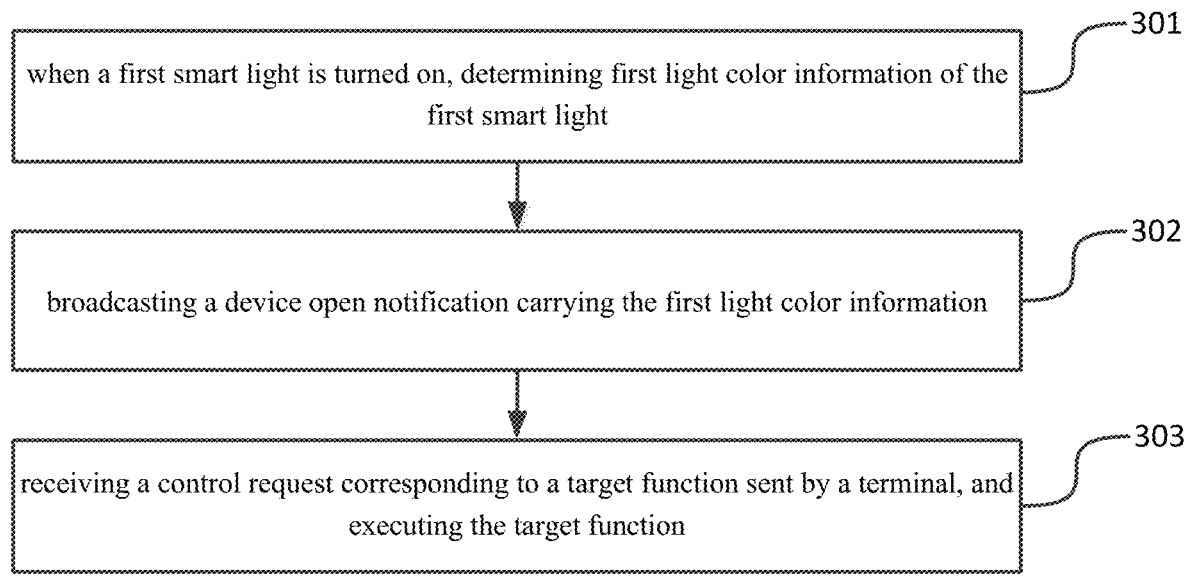
FIG. 6 is yet another flowchart illustrating steps of a method for controlling a smart light in accordance with aspects of the present disclosure.

Referring now FIG. 6, steps of the process in accordance with aspects of the present disclosure are shown. The process may include following steps.

At step 301, when the first smart light is turned on, first light color information of the first smart light is determined.

At step 302, a device open notification carrying the first light color information is broadcast.

At step 303, the control request corresponding to a target function sent by a control device is received, and the target function is executed. In some implementations, when the first smart light is turned on, the first light color information of the first smart light is determined, the device open notification carrying the first light color information is broadcast, the device open notification broadcast by the first smart light is received, in which the device open notification carries the first light color information of the first smart light.

The control option corresponding to the first smart light is then displayed according to the first light color information, and when the executing instruction of the target function triggered by the control option corresponding to the first smart light is received, a control request corresponding to the target function is sent to the first smart light, the control request corresponding to the target function sent by the control device is received, and the target function is executed. In this way, when multiple smart lights are turned on or activated substantially simultaneously, since the first smart light carries the first light color information in the device open notification, the device open notification may be differently displayed by the control device according to the first light color information, and the user may find the smart light to be controlled directly according to the color. This allows efficient control of multiple smart lights.

Figure 7:
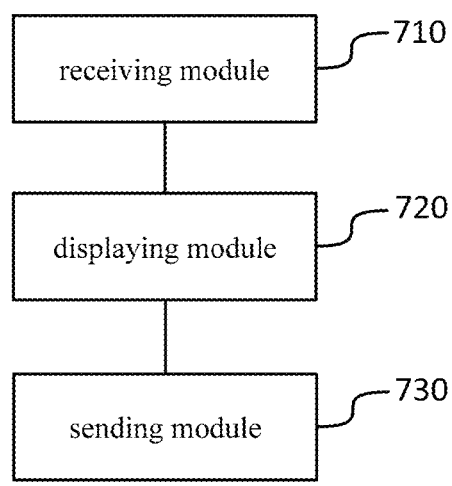
FIG. 7 is a block diagram of a control device according to an example embodiment.

In one embodiment of the present disclosure, a control device is provided. The control device may be operated in accordance with the present disclosure. As shown in FIG. 7, the control device may include a receiving module 710, a displaying module 720 and a sending module 730. Specifically, the receiving module 710 is configured to receive a device open notification broadcast by a smart device, such as a smart light, in which the device open notification carries device information of the smart device. The displaying module 720 is configured to display a control option corresponding to the smart device. For instance, a control option for light color may be displayed. The sending module 730 is configured to send a control request corresponding to the target function to the smart device when an executing instruction of a target function triggered by the control option.

Figure 8:
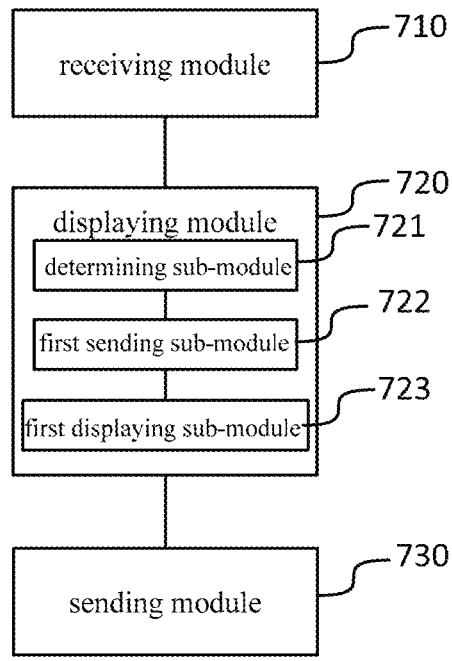
FIG. 8 is a block diagram of a control device according to an example embodiment.

In some alternative embodiments, as shown in FIG. 8, the displaying module 720 may further include a determining sub-module 721, a first sending sub-module 722 and a first displaying sub-module 723. In some aspects, the determining sub-module 721 may be configured to determine second light color information other than light color information carried in the device open notification sent by another smart light if the light color information carried in the device open notification sent by another smart light is received and the light color information received contains the first light color information. Also, the first sending sub-module 722 may be configured to send a light color changing request to the first smart light, in which the light color changing request carries the second light color information. In addition, the first displaying sub-module 723 is configured to display the control option corresponding to the first smart light according to the second light color information.

Figure 9:
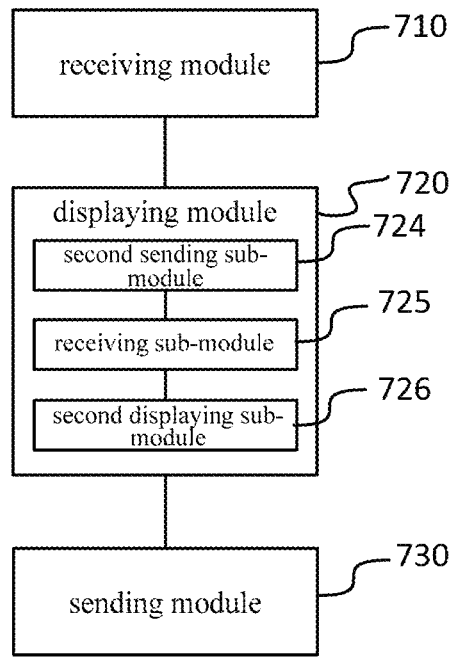
FIG. 9 is a block diagram of a control device according to an example embodiment.

In some alternative embodiments, as shown in FIG. 9, the displaying module 720 may further include a second sending sub-module 724, a receiving sub-module 725, and a second displaying sub-module 726. In some aspects, the second sending sub-module 724 may be configured to send a light color changing request to the first smart light if light color information carried in the device open notification sent by another smart light is received and the light color information received contains the first light color information, in which the light color changing request carries the light color information carried in the device open notification sent by another smart light. Also, the receiving sub-module 725 may be configured to receive the second light color information sent by the first smart light. In addition, the second displaying sub-module 726 may be configured to display the control option corresponding to the first smart light according to the second light color information. Alternatively, the displaying module 720 may be configured to display the control option corresponding to the first smart light, and set a color of text in the control option as a color corresponding to the second light color information. Alternatively, the sending module 730 may be configured to obtain a network identifier inputted by a user and send a network access request to the first smart light when an executing instruction of a target function triggered by the control option corresponding to the first smart light is received, in which the network access request carries the network identifier.

Figure 10:
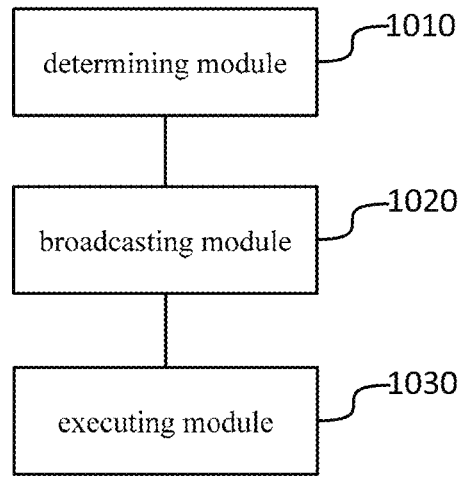
FIG. 10 is a block diagram of a first smart light according to an example embodiment.

In one embodiment of the present disclosure, a smart light is provided. The smart light may be operated in accordance with the present disclosure. As shown in FIG. 10, the smart light may include a determining module 1010, a broadcasting module 1020 and an executing module 1030. Specifically, the determining module 1010 may be configured to determine light information of the smart light, such as light color, intensity, duration, timing information, when the smart light is turned on, operated, or activated. The broadcasting module 1020 may be configured to broadcast a device open notification carrying the light information, as well as other information, such as device address, condition, and so on. The executing module 1030 may be configured to receive a control request corresponding to a target function sent by a control device, and execute the target function.

Figure 11:
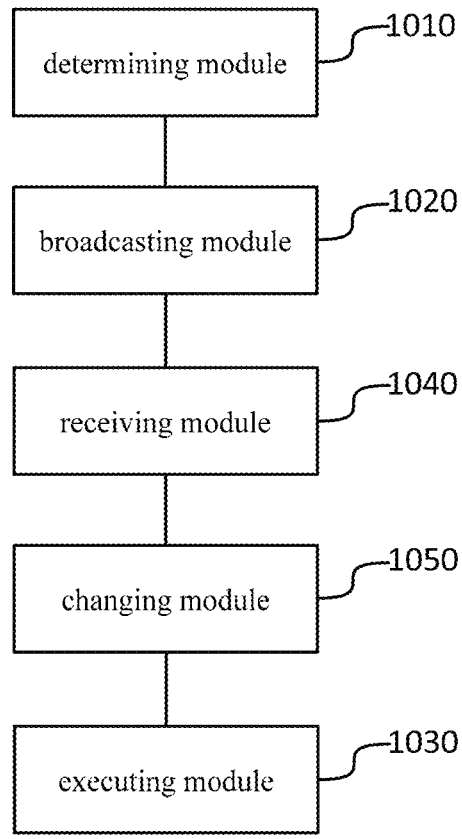
FIG. 11 is a block diagram of a first smart light according to an example embodiment.

In some alternative embodiments, as shown in FIG. 11, the smart light may further include a receiving module 1040 and a changing module 1050. The receiving module 1040 may be configured to receive a color, and other property, changing request sent by the control device. In some aspects, the request may include a color changing request carrying a second light color information. The changing module 1050 may be configured to change a light color of the smart light to a light color corresponding to the second light color information. Alternatively, the receiving module 1040 may be further configured to receive a color changing request sent by the control device, in which the color changing request carries light color information of other smart lights. The changing module 1050 may be further configured to change the light color of the smart light to a light color other than light colors corresponding to the light color information of other smart lights, and to determine the second light color information corresponding to the light color after changing. Alternatively, the receiving module 1040 may be configured to receive a network access request sent by the control device, in which the network access request carries a network identifier. The executing module 1030 may then be configured to obtained access to a corresponding network according to the network identifier.

In some implementations, when the first smart light is turned on, the first light color information of the smart light is determined, the device open notification carrying the first light color information is broadcast, the device open notification broadcast by the smart light is received, in which the device open notification carries the first light color information of the smart light; the control option corresponding to the smart light is displayed according to the first light color information; and when the executing instruction of the target function triggered by the control option corresponding to the smart light is received, a control request corresponding to the target function is sent to the smart light, the control request corresponding to the target function sent by the control device is received, and the target function is executed. In this way, when the multiple smart lights are turned on simultaneously, since the smart light carries the first light color information in the device open notification, the device open notification may be distinguishably displayed by the control according to the first light color information. As such, the user may identify the smart light to be controlled according to the color.

It should be noted that the function modules, with divided functions, described with reference to the above-described control device and smart light are mere examples. Indeed various modifications are possible. For instance, the above functions may be allocated to different function modules according to requirements, i.e. the inner structure of the device is divided into different function modules so as to complete all of or a part of functions described above.

In another embodiment of the present disclosure, a system for controlling a smart light is provided. In some implementations, the system may include a control device and a smart light, in accordance with the present disclosure. Generally, the control device may be configured to receive a device open notification broadcast by a smart light, in which the device open notification carries light information of the smart light; display a control option corresponding to the smart light according to the light information; and send a control request corresponding to the target function to the smart light when receiving an executing instruction of the target function triggered by control option corresponding to the smart light. The smart light is configured to determine light information of the smart light when the smart light is turned on; broadcast the device open notification carrying the light information; and receive the control request corresponding to the target function sent by the control device and execute the target function.

In some implementations, when the smart light is turned on, the light color information of the smart light is determined, the device open notification carrying the light color information is broadcast, the device open notification broadcast by the smart light is received, in which the device open notification carries the light color information of the smart light; the control option corresponding to the smart light is displayed according to the light color information; and when the executing instruction of the target function triggered by control option corresponding to the smart light is received, a control request corresponding to the target function is sent to the smart light, the control request corresponding to the target function sent by the control device is received, and the target function is executed. When the multiple smart lights are turned on, activated, or operated simultaneously, each smart light carries the its respective light color information in the device open notification, the device open notification may be distinguishably displayed by the control device according to the respective light color information. This way, a user may identify and selectively operate each the smart light in an efficient manner.

In one embodiment of the present disclosure, a block diagram of a control device is provided. By way of example, the control device may be a cellphone, smartphone, laptop computer, tablet, and the like.

Figure 12:
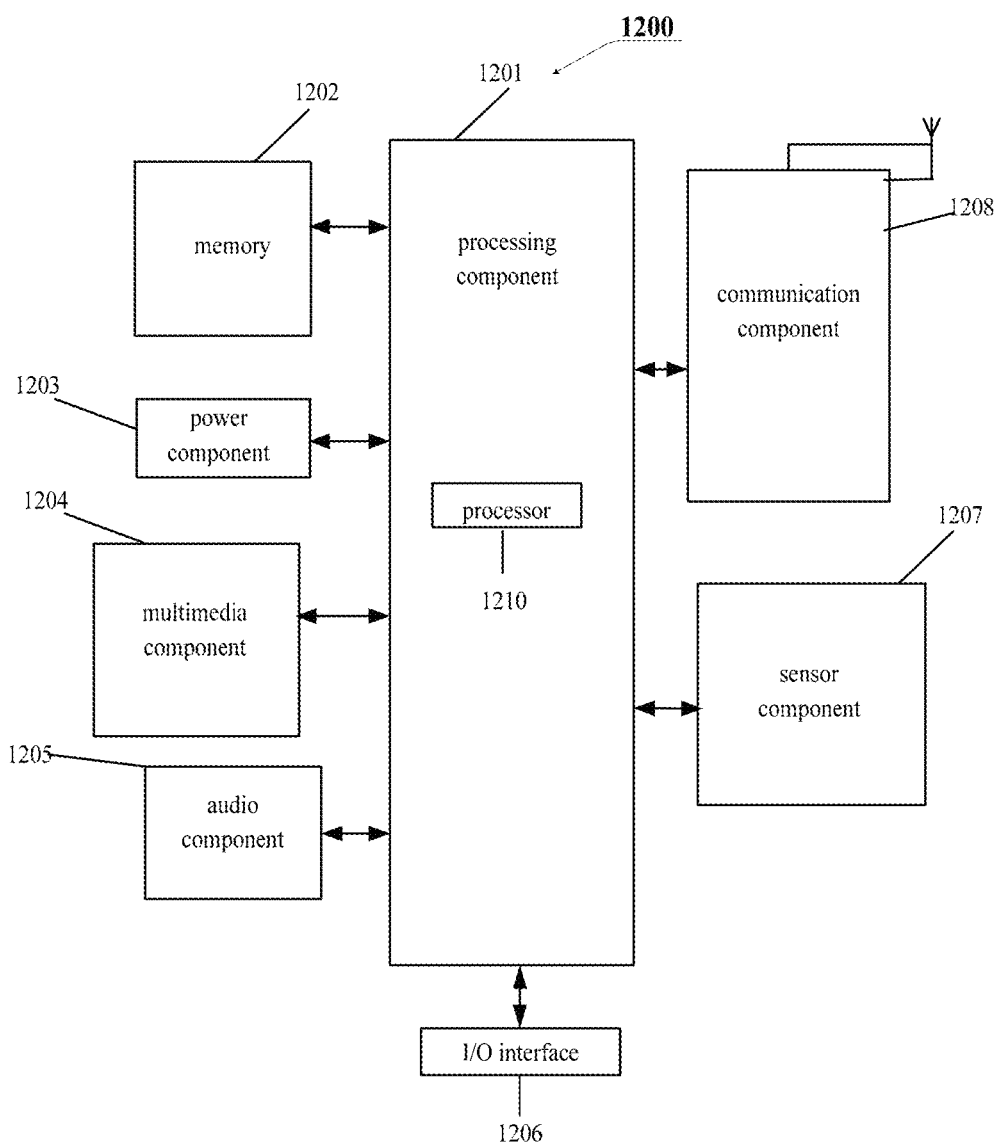
FIG. 12 is a block diagram of a control device according to an example embodiment.

Referring to FIG. 12, the control device 1200 may include the following one or more components: a processing component 1201, a memory 1202, a power component 1203, a multimedia component 1204, an audio component 1205, an Input/Output (I/O) interface 1206, a sensor component 1207, and a communication component 1208.

The processing component 1201 typically controls overall operations of the control device 1200, such as the operations associated with display, telephone calls, data communications, camera operations, and recording operations. The processing component 1201 may include one or more processors 1210 to execute instructions to perform all or part of the steps in the above described methods. Moreover, the processing component 1201 may include one or more modules which facilitate the interaction between the processing component 1201 and other components. For instance, the processing component 1201 may include a multimedia module to facilitate the interaction between the multimedia component 1204 and the processing component 1201.

The memory 1202 is configured to store various types of data to support the operation of the control device 1200. Examples of such data include instructions for any applications or methods operated on the control device 1200, contact data, phonebook data, messages, pictures, video, etc. The memory 1202 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1203 provides power to various components of the control device 1200. The power component 1203 may include a power management system, one or more power sources, and any other components associated with the generation, management, and distribution of power in the control device 1200.

The multimedia component 1204 includes a screen providing an output interface between the control device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, taps and other gestures on the touch panel. The touch sensors may not only sense a boundary of a touch or swipe action, but also sense a duration time and a pressure associated with the touch or swipe action. In some embodiments, the multimedia component 1204 includes a front camera and/or a rear camera. The front camera and the rear camera may receive external multimedia data while the control device 1200 is in an operation mode, such as a photographing mode or a video mode. Each of the front camera and the rear camera may be a fixed optical lens system or have focus and optical zoom capability.

The audio component 1205 is configured to output and/or input audio signals. For example, the audio component 1205 includes a microphone (MIC) configured to receive an external audio signal when the control device 1200 is in an operation mode, such as a call mode, a recording mode, and a voice recognition mode. The received audio signal may be further stored in the memory 1202 or transmitted via the communication component 1208.

The I/O interface 1206 provides an interface for the processing component 1201 and peripheral interface modules, such as a keyboard, a click wheel, buttons, and the like. The buttons may include, but are not limited to, a home button, a volume button, a starting button, and a locking button.

The sensor component 1207 includes one or more sensors to provide status assessments of various aspects of the control device 1200. For instance, the sensor component 1207 may detect an open/closed status of the control device 1200 and relative positioning of components (e.g. the display and the keypad of the control device 1200). The sensor component 1207 may also detect a change in position of the control device 1200 or of a component in the control device 1200, a presence or absence of user contact with the control device 1200, an orientation or an acceleration/deceleration of the control device 1200, and a change in temperature of the control device 1200. The sensor component 1207 may include a proximity sensor configured to detect the presence of nearby objects without any physical contact. The sensor component 1207 may also include a light sensor, such as a CMOS or CCD image sensor, for use in imaging applications. In some embodiments, the sensor component 1207 may also include an accelerometer sensor, a gyroscope sensor, a magnetic sensor, a pressure sensor, or a temperature sensor.

The communication component 1208 is configured to facilitate wired or wireless communication between the control device 1200 and other devices. The control device 1200 can access a wireless network based on a communication standard, such as WIFI, 2G, or 3G, or a combination thereof. In one exemplary embodiment, the communication component 1208 receives a broadcast signal or broadcast associated information from an external broadcast management system via a broadcast channel. In one exemplary embodiment, the communication component 1208 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the control device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is also provided a non-transitory computer readable storage medium including instructions, such as the memory 1202 including instructions. The above instructions are executable by the processor 1210 in the control device 1200, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium is provided. When the instructions in the memory are executed by the processor in the control device, the control device may execute a method for controlling the smart light, and the method includes: receiving a device open notification broadcast by a smart light, in which the device open notification carries light color information of the smart light; displaying a control option corresponding to the smart light according to the light color information; and when receiving an executing instruction of a target function triggered by control option corresponding to the smart light, sending a control request corresponding to the target function to the smart light.

Alternatively, displaying a control option corresponding to the smart light according to the light color information includes: if light color information carried in the device open notification sent by another smart light is received and the light color information received is the same or similar the first light color information, determining second light color information other than the light color information carried in the device open notification sent by the another smart light; sending a light color changing request to the smart light, in which the light color changing request carries the second light color information; and displaying the control option corresponding to the smart light according to the second light color information.

Alternatively, displaying a control option corresponding to the smart light according to the first light color information includes: if light color information carried in the device open notification sent by the another smart light is received and the light color information received is the same or similar to the first light color information, sending a light color changing request to the smart light, in which the light color changing request carries the light color information carried in the device open notification sent by the another smart light; receiving the second light color information sent by the smart light; and displaying the control option corresponding to the smart light according to the second light color information.

Alternatively, displaying the control option corresponding to the smart light according to the second light color information includes: displaying the control option corresponding to the smart light, and setting a color of text in the control option as a color corresponding to the second light color information. Alternatively, sending a control request corresponding to the target function to the smart light when receiving an executing instruction of a target function triggered by control option corresponding to the smart light includes: when receiving the executing instruction of the target function triggered by the control option corresponding to the smart light, obtaining a network identifier inputted by a user, and sending a network access request to the smart light, in which the network access request carries the network identifier.

In some implementations, when a smart light is turned on, or activated, the light color information of the smart light is determined, the device open notification carrying the light color information is broadcast, the device open notification broadcast by the smart light is received, in which the device open notification carries the light color information of the smart light; the control option corresponding to the smart light is displayed according to the light color information; and when the executing instruction of the target function triggered by control option corresponding to the smart light is received, a control request corresponding to the target function is sent to the smart light, the control request corresponding to the target function sent by the control device is received, and the target function is executed.

Figure 13:
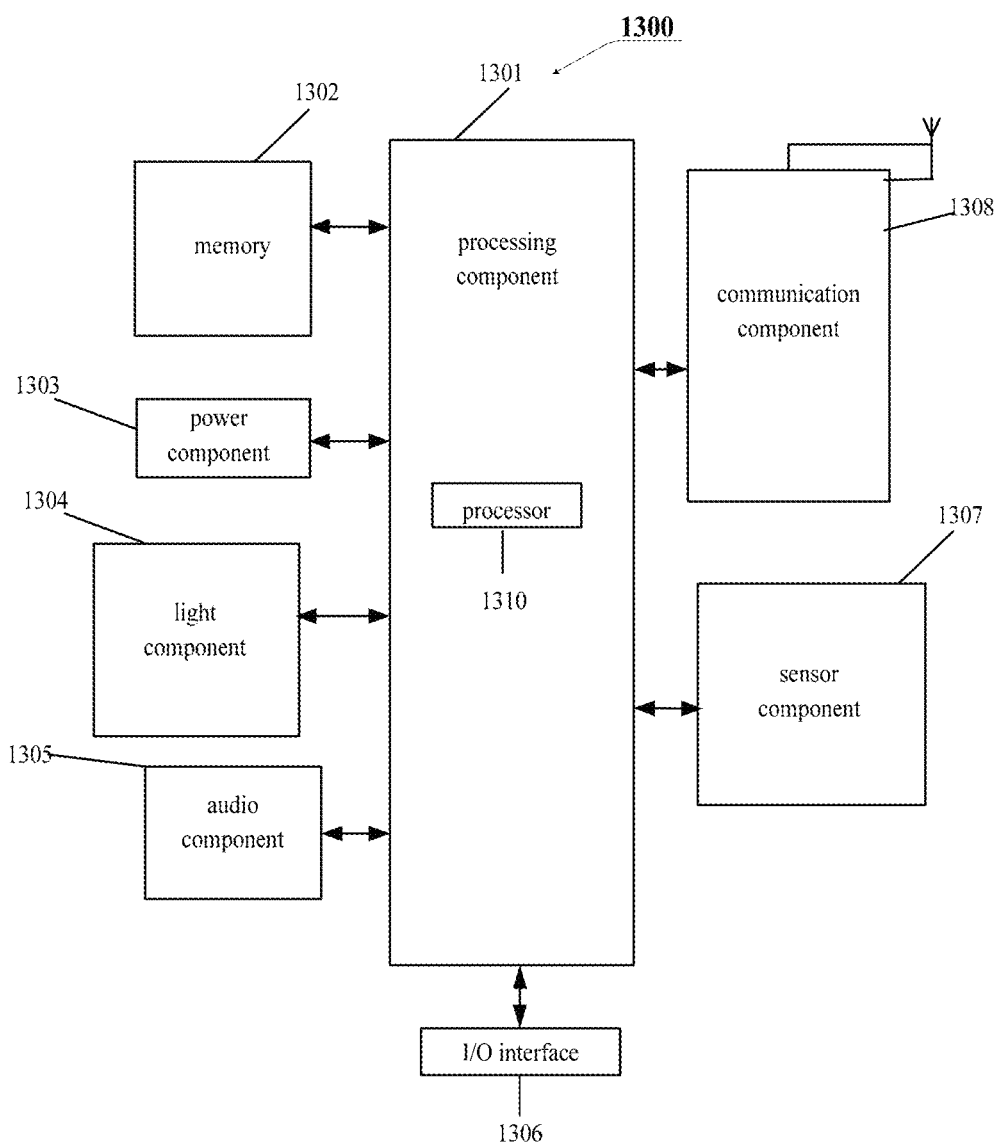
FIG. 13 is a block diagram of a smart light according to an example embodiment.

In yet another embodiment of the present disclosure, a block diagram of a smart device 1300 is provided. The smart device 1300 may be a smart light, a smart switch, a smart outlet, a smart socket, etc. Referring to FIG. 13, the smart device 1300 may include the following one or more components: a processing component 1301, a memory 1302, a power component 1303, a light component 1304, an audio component 1305, an Input/Output (I/O) interface 1306, a sensor component 1307, and a communication component 1308.

The processing component 1301 typically controls overall operations of the smart device 1300, such as the operations associated with display, telephone calls, data communications, camera operations, and recording operations. The processing component 1301 may include one or more processors 1310 to execute instructions to perform all or part of the steps in the above described methods. Moreover, the processing component 1301 may include one or more modules which facilitate the interaction between the processing component 1301 and other components.

The memory 1302 is configured to store various types of data to support the operation of the smart device 1300.

Examples of such data include instructions for any applications or methods operated on the smart device 1300, contact data, phonebook data, messages, pictures, video, etc. The memory 1302 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1303 provides power to various components of the smart device 1300. The power component 1303 may include a power management system, one or more power sources, and any other components associated with the generation, management, and distribution of power in the smart device 1300.

The light component 1304 may control the light color of the smart device 1300. The audio component 1305 is configured to output and/or input audio signals. The received audio signal may be further stored in the memory 1302 or transmitted via the communication component 1308. The I/O interface 1306 provides an interface for the processing component 1301 and peripheral interface modules.

The sensor component 1307 includes one or more sensors to provide status assessments of various aspects of the smart device 1300. For instance, the sensor component 1307 may detect a change in position of the smart device 1300 or of a component in the smart device 1300, a presence or absence of user contact with the smart device 1300, an orientation or an acceleration/deceleration of the smart device 1300, and a change in temperature of the smart device 1300. The sensor component 1307 may include a proximity sensor configured to detect the presence of nearby objects without any physical contact.

The communication component 1308 is configured to facilitate wired or wireless communication between the smart device 1300 and other devices. The smart device 1300 can access a wireless network based on a communication standard, such as WIFI. In one exemplary embodiment, the communication component 1308 receives a broadcast signal or broadcast associated information from an external broadcast management system via a broadcast channel. In one exemplary embodiment, the communication component 1308 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the smart device 1300 may include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some example embodiments, there a non-transitory computer readable storage medium including instructions, such as the memory 1302 including instructions, is also provided. The above instructions are executable by the processor 1310 in the smart device 1300, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium is provided. When the instructions in the memory are executed by the processor in the smart light, the smart light may execute a method for controlling the smart light, and the method includes: when a first smart light is turned on, determining first light color information of the first smart light; broadcasting a device open notification carrying the first light color information; and receiving a control request corresponding to a target function sent by a control device, and executing the target function. Alternatively, the method further includes: changing request carries second light color information; and changing a light color to a light color corresponding to the second light color information. Alternatively, the method further includes: receiving a color changing request sent by the control device, in which the color changing request carries light color information of another smart light; changing a light color to a light color other than a light color corresponding to the light color information of another smart light, and determining second light color information corresponding to the light color after changing; and sending the second light color information to the control device. Alternatively, receiving a control request corresponding to a target function sent by a control device, and executing the target function includes: receiving network access request sent by the control device, in which the network access request carries a network identifier; and accessing a corresponding network according to the network identifier.

In the present embodiments, when a smart light is turned on, or activated, the light color information of the smart light is determined, the device open notification carrying the light color information is broadcast, the device open notification broadcast by the smart light is received, in which the device open notification carries the light color information of the smart light; the control option corresponding to the smart light is displayed according to the light color information; and when the executing instruction of the target function triggered by control option corresponding to the smart light is received, a control request corresponding to the target function is sent to the smart light, the control request corresponding to the target function sent by the control device is received, and the target function is executed.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the invention will be apparent to those skilled in the art from consideration of the specification and practice of the invention disclosed hereby. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples that have been described above and illustrated in the accompanying drawings, and that various modifications and changes can be made without departing form the scope thereof. It is intended that the scope of the invention only be limited by the appended claims.

What is claimed is:

1. A method for controlling a first smart light using a control device, the method comprising:
   receiving, using the control device, a first device open notification broadcast by the first smart light, wherein the first device open notification carries at least first light information corresponding to the first smart light;
   displaying, on the control device, a control option for the first smart light according to the first light information, wherein the control option is distinguishably displayed for different light information;
   receiving, using the control device, a second device open notification broadcast by a second smart light, wherein the second device open notification carries at least second light information corresponding to the second smart light,
   modifying, by the control device, the control option displayed for the first smart light according to the second light information automatically without user input;
   selectively operating, using the control device, the control option to execute a target function controlling the first smart light; and
   sending, from the control device, a control request to the first smart light corresponding to the target function.

2. The method of claim 1, wherein the light information comprises at least one of a light color, a light intensity, a light duration, and a light timing.

3. The method of claim 1, further comprising:
   determining the second light information corresponding to the second smart light from the second device open notification broadcast.

4. The method of claim 1, wherein modifying the control option displayed for the first smart light further comprises modifying a text color associated with the first smart light in the control option.

5. The method of claim 1, further comprising:
   modifying the control request based on the second light information corresponding to the second smart light.

6. The method of claim 1, wherein the control request comprises a light property changing request that when executed by the first smart light allows the light property of the first smart light to be changed.

7. The method according to claim 1, further comprising:
   obtaining a network identifier inputted by a user, and sending a network access request to the first smart light, in which the network access request carries the network identifier.

8. A method for controlling a first smart light, comprising:
   when a first smart light is activated, determining a first light color information of the first smart light;
   broadcasting a first device open notification carrying the first light color information, wherein the first light color information comprises a light color emitted by the first smart light;
   receiving a control request corresponding to a target function sent by a control device, and executing the target function;
   displaying the first device open notification, wherein the first device open notification is distinguishably displayed for different light color information;
   when a second smart light is activated, receiving a color changing request sent by the control device, wherein the color changing request carries light color information of a second smart light;
   changing the light color emitted by the first smart light based on the color changing request carrying the light color information of the second smart light; and
   causing the control device to modify a control option displayed for the first smart light according to the light color information of the second smart light so that the first device open notification is distinguishably displayed by the control device.

9. The method according to claim 8, wherein changing a light color of the first smart light based on the color changing request carrying the light color information of the second smart light further comprises:
   changing a light color of the first smart light to a light color other than a light color corresponding to the light color information of the second smart light, and determining second light color information corresponding to the light color after changing; and
   sending the second light color information to the control device.

10. The method according to claim 8, wherein, receiving a control request corresponding to a target function sent by a control device and executing the target function comprises:
    receiving network access request sent by the control device, wherein the network access request carries a network identifier; and
    accessing to a corresponding network according to the network identifier.

11. A control device, comprising:
    a processor; and
    a memory, configured to store instructions executable by the processor,
    wherein, the processor is configured to:
      receive a first device open notification broadcast by a first smart light, in which the first device open notification carries at least first light color information of the first smart light;
      display a control option corresponding to the first smart light according to the first light color information, wherein the control option is distinguishably displayed for different first color light information;

receive a second device open notification broadcast by a second smart light, wherein the second device open notification carries at least light color information of the second smart light;

modify the control option displayed for the first smart light according to the second device open notification automatically without user input; and send a control request corresponding to a target function to the first smart light when an executing instruction of the target function triggered by the control option corresponding to the first smart light is received.

12. The control device according to claim 11, wherein, the processor is configured to:

determine second light color information other than the light color information carried in the second device open notification sent by the second smart light if the light color information carried in the second device open notification sent by the second smart light is received and the light color information received contains the first light color information;

send a light color changing request to the first smart light, in which the light color changing request carries the second light color information; and display the control option corresponding to the first smart light according to the second light color information.

13. The control device according to claim 12, wherein, the processor is configured to:

display the control option corresponding to the first smart light, and set a color of text in the control option as a color corresponding to the second light color information.

14. The control device according to claim 11, wherein, the processor is configured to:

send a light color changing request to the first smart light if the light color information carried in the second device open notification sent by the second smart light is received and the light color information received contains the first light color information, in which the light color changing request carries the light color information carried in the second device open notification sent by the second smart light;

receive a second light color information sent by the first smart light; and display the control option corresponding to the first smart light according to the second light color information.

15. The control device according to claim 11, wherein, the processor is configured to:

obtain a network identifier and send a network access request to the first smart light when the executing instruction of the target function triggered by the control option corresponding to the first smart light is received, in which the network access request carries the network identifier.

16. A first smart light, comprising:

a processor; and a memory, configured to store instructions executable by the processor, wherein the processor is configured to:

determine first light information of the first smart light when the first smart light is activated;

broadcast a first device open notification carrying the first light information including at least first light color information, wherein the first light color information comprises a light color emitted by the first smart light;

receive a control request from a control device corresponding to a target function sent by the control device, and to execute the target function, wherein the first device open notification is displayed, and the first device open notification is distinguishably displayed for different light color information, receive a color changing request sent by the control device, wherein the color changing request carries light color information of a second smart light, change the light color emitted by the first smart light according to the color changing request carrying the light color information of the second smart light, and cause the control device to modify a control option displayed for the first smart light according to the light color information of the second smart light so that the first device open notification is distinguishably displayed by the control device.

17. The first smart light according to claim 16, wherein the processor is configured to change a light color of the first smart light according to the color changing request carrying the light color information of the second smart light comprises that the processor is further configured to:

change a light color of the first smart light to a light color other than a light color corresponding to the light color information of the second smart light, and to determine second light color information corresponding to the light color after changing; and send the second light color information to the control device.

18. The first smart light according to claim 16, wherein the processor is further configured to:

receive a network access request sent by the control device, in which the network access request carries a network identifier; and access to a corresponding network according to the network identifier.

* * * * *